United States Patent
Coenen et al.

(10) Patent No.: US 6,340,736 B1
(45) Date of Patent: Jan. 22, 2002

(54) METHOD AND APPARATUS FOR THE PRODUCTION OF POLYCARBONATES WITH BRINE RECYCLING

(75) Inventors: Nicolaas Petrus Maria Coenen, Bergen Op Zoom; Jan Cornelis Gerritsen, Avenhorn; Rolf Grootveld, Hulst; Martin Herke Oyevaar, SC Goes, all of (NL); Raimund Frans Vandenbussche, Berchem (BE); Hendricus Franciscus Zirkzee, Schore (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/450,409

(22) Filed: Nov. 29, 1999

(51) Int. Cl.[7] .............................................. C08G 64/00

(52) U.S. Cl. ..................... 528/196; 210/760; 252/32; 252/182; 528/198

(58) Field of Search ................. 528/196, 198; 210/760; 252/32, 182

(56) References Cited

U.S. PATENT DOCUMENTS

| | | | |
|---|---|---|---|
| 3,655,333 A | 4/1972 | Stenger | 23/89 |
| 3,919,433 A | 11/1975 | Senior | 426/320 |
| 3,945,969 A | 3/1976 | Horn et al. | 526/64 |
| 3,970,528 A | 7/1976 | Zirngiebl et al. | 205/536 |
| 3,989,672 A | 11/1976 | Vestergaard | 260/47 |
| 4,060,465 A | 11/1977 | Yokata et al. | 205/618 |
| 4,078,978 A | 3/1978 | Zirngiebl | 205/536 |
| 4,115,219 A | 9/1978 | Gancy et al. | 205/527 |
| 4,116,358 A | 9/1978 | Kinghorn et al. | 220/222 |
| 4,119,508 A | 10/1978 | Yokata | 205/618 |
| 4,126,526 A | 11/1978 | Kwon et al. | 205/536 |
| 4,132,759 A | 1/1979 | Schafer | 423/161 |
| 4,207,152 A | 6/1980 | Kadija et al. | 205/536 |
| 4,267,026 A | 5/1981 | Patel | 205/536 |
| 4,279,869 A | 7/1981 | Coulson | 423/54 |
| 4,303,624 A | 12/1981 | Dotson et al. | 423/184 |
| 4,336,232 A | 6/1982 | Moritz | 423/164 |
| 4,341,752 A | 7/1982 | Groenhof | 423/497 |
| 4,376,100 A | 3/1983 | Lee et al. | 423/179.5 |

(List continued on next page.)

FOREIGN PATENT DOCUMENTS

| | | |
|---|---|---|
| EP | 0 541 114 A2 | 5/1993 |
| JP | 56020173 | 2/1981 |
| JP | 11 285693 | 10/1999 |

OTHER PUBLICATIONS

PCT International Search Report for International application No. PCT/US/00/30262, International filing date Nov. 2, 2000.
U.S. application No. 09/177,588 (Docket No. RD-25117), filed on Coc. 23, 1998.
U.S. application No. 09/378,957 (Docket No. RD-24971), filed on Aug. 23, 1999.

*Primary Examiner*—Terressa M. Boykin

(57) ABSTRACT

Brine produced in an interfacial polycarbonate plant can be treated to render it useful for recycle to the electrolytic cell, which is used in the production of chlorine. The waste brine stream is combined with ozone to produce an ozonated brine in which the amounts of organic contaminants such as phenol, bisphenol A and chloromethyltrimetlhyl ammonium chloride is reduced. The ozonated brine is then acidified to remove carbonates and produce a decarbonated brine which is then concentrated to produce a treated brine in which the concentration of NaCl is at least 10 wt % NaCl. A filtration step may be included prior to the ozonation to remove particulate impurities. When used in an interfacial polycarbonate plant in combination with chlorine, phosgene and polycarbonate producing facilities, this allows recycling of the brine waste stream and this provides an environmentally superior and highly cost effective method for the producing polycarbonate.

22 Claims, 3 Drawing Sheets

U.S. PATENT DOCUMENTS

| | | | |
|---|---|---|---|
| 4,415,460 A | 11/1983 | Suciu et al. ................. | 210/754 |
| 4,448,682 A | 5/1984 | Moritz ....................... | 210/101 |
| 4,470,891 A | 9/1984 | Moore et al. ............... | 205/536 |
| 4,544,488 A | 10/1985 | O'Brien ..................... | 210/664 |
| 4,586,993 A | 5/1986 | O'Brien ..................... | 205/512 |
| 4,592,768 A | 6/1986 | Cutler et al. ................. | 62/532 |
| 4,648,977 A | 3/1987 | Garg et al. ................. | 210/673 |
| 4,746,441 A | 5/1988 | Yagishita et al. ........... | 210/712 |
| 4,747,917 A | 5/1988 | Reynolds et al. ........... | 205/512 |
| 4,818,773 A | 4/1989 | Cornette et al. ............. | 521/32 |
| 4,855,059 A | 8/1989 | Frianeza-Kullberg ....... | 210/670 |
| 5,028,302 A | 7/1991 | Rutherford .................. | 205/536 |
| 5,034,127 A | 7/1991 | Yagishita et al. ........... | 210/337 |
| 5,034,129 A | 7/1991 | Ten Hove ................... | 210/490 |
| 5,126,019 A | 6/1992 | Rutherford et al. ......... | 205/516 |
| 5,178,755 A | 1/1993 | LaCrosse ................. | 210/195.1 |
| 5,352,362 A | 10/1994 | Mizutani et al. ........... | 210/650 |
| 5,366,514 A | 11/1994 | Becnel, Jr. et al. ........... | 23/303 |
| 5,505,856 A | 4/1996 | Camped et al. .............. | 210/668 |
| 5,578,218 A | 11/1996 | Matsuoka et al. .......... | 210/672 |
| 5,681,447 A | 10/1997 | Maycock et al. ........... | 205/536 |
| 5,690,820 A | 11/1997 | Becnel, Jr. et al. ......... | 210/170 |
| 5,888,403 A | 3/1999 | Hayashi ..................... | 210/695 |

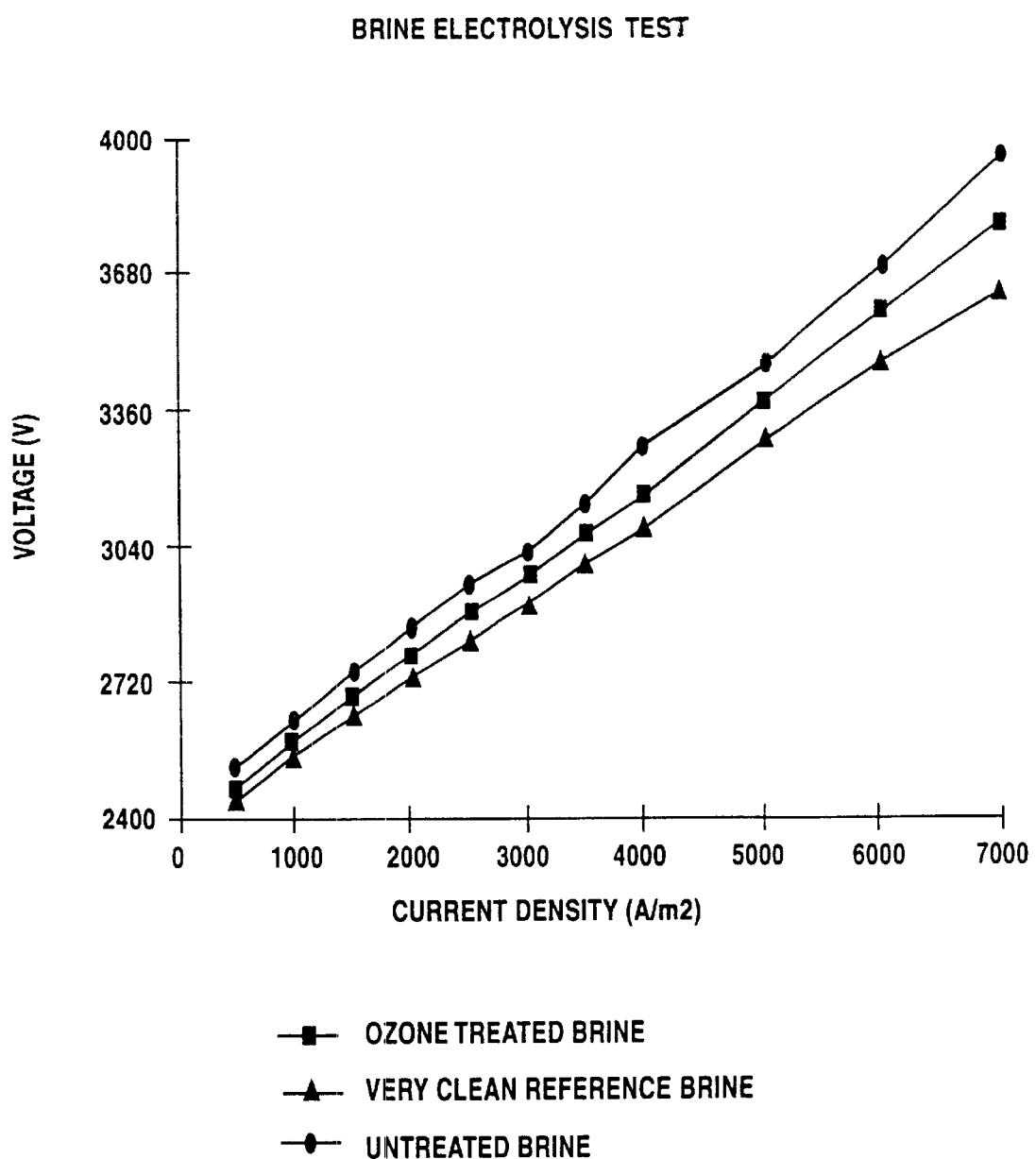

METHOD AND APPARATUS FOR THE PRODUCTION OF POLYCARBONATES WITH BRINE RECYCLING

FIELD OF THE INVENTION

This application relates to a method and apparatus for the production of polycarbonates via an interfacial process in which the NaCl brine produced at the end of the process is treated and recycled for use as a feedstock in the electrolytic production of chlorine.

BACKGROUND OF THE INVENTION

The interfacial process for production of polycarbonates is well known, and is described inter alia in U.S. Pat. Nos. 3,945,969; 3,989,672 and 4,115,358. In general, the process as shown in FIG. 1 involves electrolytic production of chlorine from a concentrated (e.g. 20–30wt %) NaCl brine solution. The chlorine produced is combined with carbon monoxide to produce phosgene, which is reacted with a dihydric phenol such as bisphenol A in an interfacial polycarbonate facility. The interfacial polycarbonate facility produces polycarbonate, which is the desired product, and a waste brine which contains approximately 15wt % NaCl and various organic and inorganic impurities.

At present, this waste brine is simply disposed of as an industrial effluent. Doing such disposal properly is expensive, and may nevertheless place a burden on the environment. It would therefore be desirable to be able to recycle this brine in a useful manner consistent with the needs of the interfacial polycarbonate plant.

Recycle of NaCl brines from various sources is known in the art. For example, it is common practice to treat the anolyte brine which is produced as a waste product from the electrolytic production of chlorine to produce a more concentrated brine which can be utilized once again as a feedstock for electrolytic production of chlorine. Various processes for treating brine for use in electrolysis reactions are disclosed in U.S. Pat. Nos. 3,970,528, 4,060,465, 4,078,978, 4,115,219, 4,119,508, 4,132,759, 4,415,460, 4,470,891, 4,746,441, 4,747,917, 4,855,059, 5,034,129, 5,082,302, 5,126,019, 5,352,362 and 5,681,447. These disclosures all make it clear that membranes used in electrolytic processes are very sensitive to numerous types of impurities, and therefore that careful purification of any recycled brine is required to avoid fouling the electrolytic cell. Because of this sensitivity, any consideration of utilizing recycled brines derived from processes other than the electrolysis process itself which may contain additional impurities must address these additional impurities and provide for their removal as necessary.

U.S. Pat. Nos. 4,126,526 and 4,415,460 disclose processes for removal of organic materials from a recycle brine prior to reintroduction of the brine to a chlorine-producing electrolysis cell. In the first case, chlorine is used to convert the organic impurities to more volatile organic compounds which are separated from the brine by stripping. This process has the advantage of using materials already on hand (i.e., chlorine), but has the disadvantage of producing a waste stream containing chlorinated hydrocarbons which may themselves be undesirable to introduce into the environment. In the second case, organic impurities arising during the production of olefin oxides are oxidized with chlorate ions at a pH of 5.0 or less to convert the organic impurities into carbon dioxide. The differences in the nature of the organic impurities found in waste streams from olefin oxide production and those from interfacial polycarbonate production, and the reduced oxidizing power of chlorates make it doubtful, however, that the same process would be effective to produce a usable recycled brine in the latter process. Furthermore, utilization of chlorates for oxidation would result in yellowing of the product which is undesirable.

U.S. Pat. No. 5,505,856 discloses an ozonation process for the removal of organic materials from contaminated water. U.S. Pat. No. 5,178,755 discloses a combination of ozone and UV irradiation for treatment of contaminated water. (see also U.S. Pat. No. 5,888,403). These processes are not used to remove organic contaminants from a brine stream for recycling, and are not used for the same types of contaminants which are found in the waste brine streams from the production of polycarbonates.

SUMMARY OF THE INVENTION

We have now identified a process for treating brine produced in an interfacial polycarbonate plant to render it useful for recycle to the electrolytic cell. In accordance with an embodiment of the invention, this process includes the steps of (a) combining the waste brine stream with ozone to produce an ozonated brine in which the concentration of at least some of the organic impurities is reduced;

(b) acidifying the ozonated brine to remove carbonates and produce a decarbonated brine; and (c) concentrating the decarbonated brine to produce a treated brine in which the concentration of NaCl is at least 10 wt % NaCl, and preferably at least 20%. A filtration step may be included prior to the ozonation to remove particulate impurities.

When used in an interfacial polycarbonate plant in combination with chlorine, phosgene and polycarbonate producing facilities, the method of the invention provides an environmentally superior and highly cost effective method for the producing polycarbonate.

BRIEF DESCRIPTION OF THE DRAWINGS

FIG. 4 shows results from a brine electrolysis test.

DETAILED DESCRIPTION OF THE INVENTION

The present application relates to methods and apparatus for purification of brine solutions to reduce contaminants to levels which do not significantly interfere with the utilization of that brine as a feedstock in an electrolytic cell for the production of chlorine, and to a specific application of such a purification in the production of polycarbonates. As used in the specification and claims of this application, the term "brine" generally refers to an aqueous solution of an inorganic salt containing a concentration of salt of at least half the saturation concentration of that salt. The term "NaCl brine" refers to a brine solution of NaCl, i.e., to a solution having a concentration of at least 10 wt % NaCl. NaCl brines produced as waste streams in industrial processes commonly have a concentration of 10–25 wt % NaCl, and more commonly a concentration of 10–15 wt % NaCl.

Figure 1:
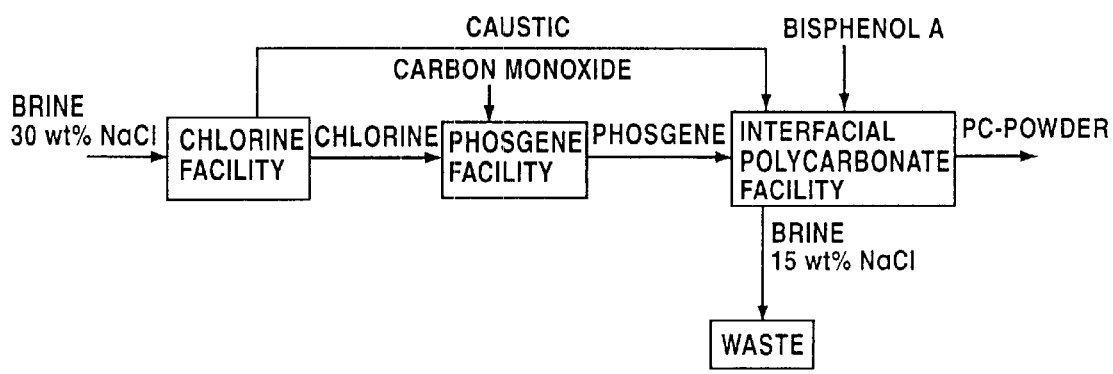
FIG. 1 shows a schematic representation of a conventional plant for the manufacture of polycarbonate via an interfacial process.
Figure 2:
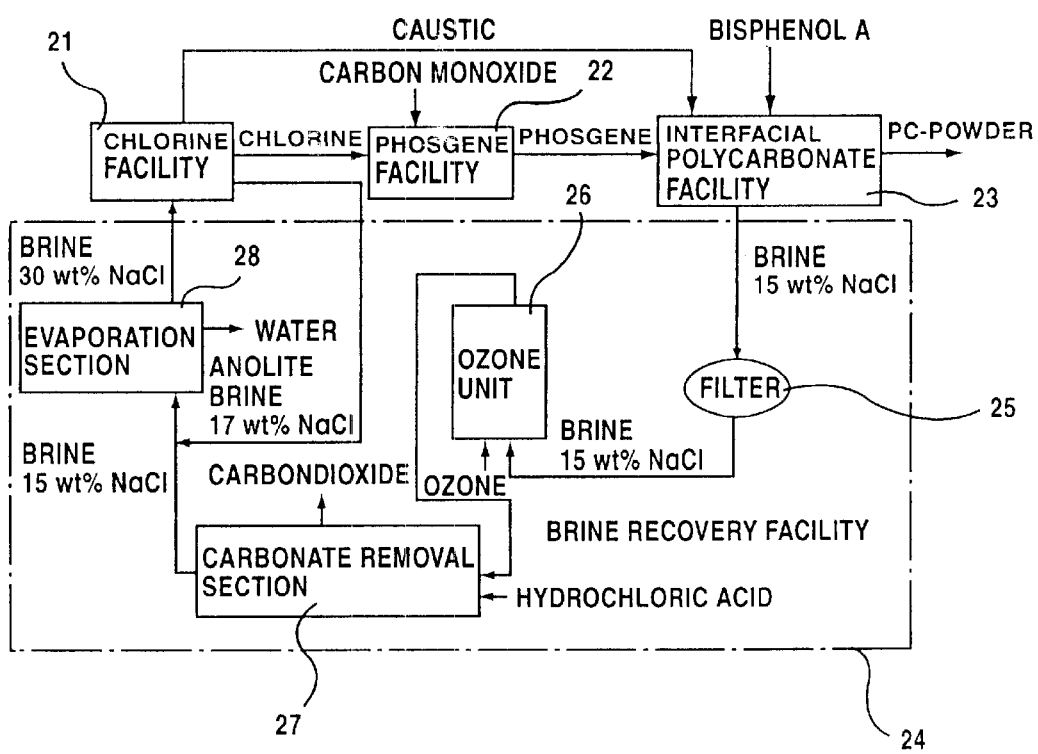
FIG. 2 shows a schematic representation of a polycarbonate plant suitable for practicing an embodiment of the invention.

FIG. 2 shows a schematic representation of a polycarbonate plant suitable for producing polycarbonate with a brine recycle. The plant include a chlorine facility 21 for electrolytically generating chlorine from NaCl brine, a phosgene facility 22 for generating phosgene from carbon monoxide and the chlorine and an interfacial polycarbonate facility 23 for generating polycarbonate from the reaction of the phosgene with a dihydric phenol in the presence of a base. The base may be supplied as caustic (NaOH) which is generated in the chlorine facility as shown in FIG. 2. The dihydric phenol may be any of the various compounds known for use in the production of polycarbonates, including but not limited to those phenols which can be employed in the synthesis of polycarbonates having the general formula

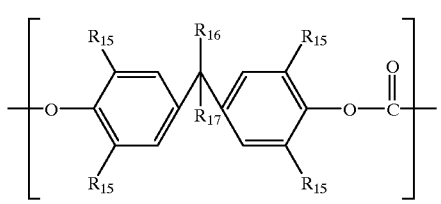

(IV)

where $R_{15}$ is selected independently from the group consisting of H and $C_1$–$C_3$ alkyl, and $R_{16}$ and $R_{17}$ are independently $C_1$–$C_6$ alkyd or aryl. A preferred dihydric phenol which is commonly employed in the commercial production of polycarbonate is bisphenol A.

The polycarbonate facility 23 produces a waste brine solution which generally contains about 15 wt % NaCl, together with various organic and inorganic impurities. This waste brine is introduced to a brine recovery facility 24 which treats the waste NaCi brine stream in accordance with the method of the invention to produce a treated brine suitable for use in electrolytic production of chlorine.

In the embodiment of the brine recovery unit shown in FIG. 2, the brine stream is first passed through a filter 25 to remove particulates. It is desirable to maintain the level of particulates having a particle size in excess of 2 microns at a level of less than about 2 mg/ml. A suitable filter for this purpose is a Kallsep filter which removes particles with a size larger than 2 microns and has a self-regenerating capability. Of course, not all brine streams will require filtration, and other filter types and methods for reduction of particulates including centrifugation could be utilized if preferred by a person skilled in the art. The placement of the filter at this stage of the process is important, since otherwise particulates may contaminate the ozone reactor, leading to unacceptable pressure drops.

After filtration, the brine stream is introduced into an ozonation unit 26 for reaction with ozone. The organic contaminants in the brine are completely oxidized to form $CO_2$, $H_2O$ and $NO_3$, as well as intermediate products, by reaction with oxidative radials derived from ozone. This results in the reduction in the levels of organic contaminants from the polycarbonate production, including in particular bisphenol A or other dihydric phenol, acetone, phenol and chloromethyltrimethyl ammonium chloride ("quat salt"). Substantial removal of these contaminants is desirable to achieve maximum performance in an electrolytic cell employing recycled brine as a feedstock. In particular, the presence of "quat salt" can cause foaming of the caustic product and sharply increase the membrane voltage.

Figure 3:
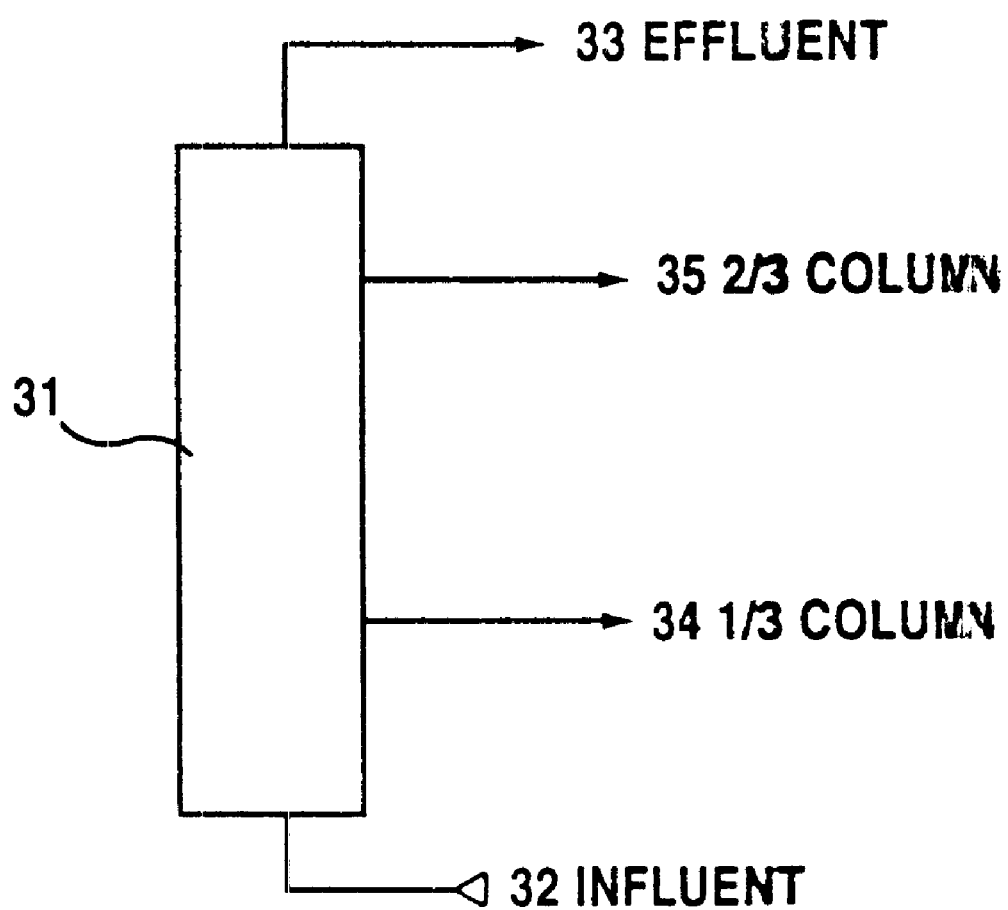
FIG. 3 shows an ozonation unit which can be used removing organic contaminants from waste brine.

A suitable ozonation unit for use in the invention is illustrated in FIG. 3. The ozonation is performed in a column 31 packed with a catalyst to which the liquid brine stream and the ozone gas stream are introduced at the bottom (influent 32). Suitably, the ozone is introduced at room temperature, while the temperature of the brine may vary, for example from about 25° C. to 60° C. The catalyst absorbs and oxidizes the organic contaminants, and is regenerated by the ozone stream. The product brine is recovered as a liquid from the top of the column (effluent 33). Countercurrent flow of brine and ozone may also be used. The sample recovery points 34, 35 shown in FIG. 3 at ⅓ and ⅔ the length of the column are used for monitoring of the performance of the column and are not required for the procedure.

It is desirable to add a small amount of water to the ozone gas stream which is introduced into the column. This limits precipitation of salts at the ozone gas diffuser, since the water is able to flush such salts away.

Exemplary catalyst materials which can be used in the ozonation column include activated carbon, alumina and silica as has been previously described in US Pat. No. 5,505,856 which uses such columns for the treatment of water contaminated with halogenated hydrocarbons, dioxines and PCB's, pesticides, insecticides, (polycyclic) aromatics, cyanides, (glycol) esters, organic acids, alcohols, and hydrocarbons. A preferred embodiment utilizes needle-shaped particles that are 5 mm by 1 mm in size, preferably 3 mm by 0.5 mm.

Alternatively, oxidative radicals can be generated from ozone and/or oxygen through the use of UV radiation. Shorter wavelengths (e.g., <200 nm) can be used to generate activated ozone directly from oxygen. Longer wavelengths, (e.g. 245 nm) can be used to activate ozone, but will not produce additional ozone. This procedure is suitably carried out in an unpacked column, since otherwise the penetration depth of the UV could be too low.

As shown in Table 1 and Example 1 below, the ozonation unit 26 effectively removes substantially all of the phenol and bisphenol A from the influent brine, and significantly decreases the amount of quat salt. In some cases, increases in the amount of acetone and methylene chloride are observed, perhaps as a result of in situ formation of these materials as breakdown products of others contaminants.

Returning to the brine recovery facility 24 as depicted in FIG. 2, the ozonated brine is next introduced to a carbonate removal section 27 where it is acidified to reduce the pH and convert carbonates present in the brine to $CO_2$ which is removed as a gas. No vacuum is required to facilitate separation, which can be driven solely by temperature in order to maintain a low cost for the process. It is desirable to reduce the carbonate levels to less than 2 mg carbonate/liter of brine, which can be achieved by adjusting the pH of the brine to about 4 or below. A preferred acid for use in this step is HCl, since this introduces no anions not already present in the brine. Other acids could be used, but HCl is the inexpensive and commonly available, and is therefore preferred.

The positioning of the carbonate removal section 27 downstream from the ozonation unit 26 is desirable for two reasons. First, because the pH of the brine in the ozonation unit 26 is high, potential problems with the precipitation of bisphenol A are avoided. If the carbonate removal section 27 were placed first, lowering the pH to 4 could result in bisphenol A precipitation during ozonation, which would foul the catalyst, and reduce its lifetime and efficiency. Second, the carbonate removal section 27 is also effective to remove acetone and methylene chloride. Since these materials appear to increase in concentration during the ozonation, it is important to have this removal occur after the ozonation unit 26 for maximum effectiveness.

The final phase of the brine recovery facility concentrates the brine to a level useable as a feedstock in the electrolytic cell of the chlorine facility. For example, as shown in FIG. 3, an evaporation section 28 can be used to concentrate the decarbonated brine to a concentration of at least 20 wt % and preferably to a concentration of about 20 to 30 wt %, more preferably from 23–26 wt %. In a specific embodiment of the invention, the concentration of the brine is 24.5 wt %. It is preferred to avoid concentrations which are so high that precipitation occurs at operating temperatures. Anolyte brine (containing about 17% NaCl) may be combined with the decarbonated brine prior to the concentration. Other concentration methods, including reverse osmosis (see U.S. Pat. No. 5,366,514), microwave energy (see U.S. Pat. No. 4,267,026), a combination of freeze concentration, centrifugation and reverse osmosis (see U.S. Pat. No. 4,592,768) and crystallization of a hydrate to remove water (see U.S. Pat. No. 3,655,333) could also be employed, and other sources of NaCl can also be used to increase the brine concentration prior to concentration by evaporation or other means.

The invention will now be further illustrated by the following, non-limiting examples.

EXAMPLE 1

A 200 cm long column with a diameter of 65 cm was packed with acivated carbon for testing the ability of ozonation to remove organic contaminants of the type generated during production of polycarbonate from NaCl brine. Actual waste NaCl brine from an interfacial polycarbonate facility was used. This NaCl brine was found to contain approximately 15 wt % NaCl, and phenol, bisphenol A, acetone, methylene chloride and quat salt in varying amounts.

The NaCl brine and ozone were introduced through the bottom of the column in co-current flow at a temperature of 25° C. for the brine and at room temperature for the ozone. The concentration of ozone was 14 g/cm$^3$, and the residence time of the brine in the column was 30 minutes. Concentrations of organic contaminants were determined before and after passage through the column. The amounts of bisphenol A and phenol were determined using HPLC. The amounts of acetone and methylene chloride were determined using gas chromatography. The quat salt concentration was determined by UV-spectroscopy using a methyl orange/boric acid reagent. The results of two trials made using different waste brines are summarized in Table 1. As can be seen, the concentrations of phenol, bisphenol A and quat salt are all substantially reduced by treatment in the column.

TABLE 1

| | First Trial | | Second Trial | |
|---|---|---|---|---|
| Component | Influent (mg/l) | Effluent (mg/l) | Influent (mg/l) | Effluent (mg/l) |
| phenol | 0.14 | 0 | 0.24 | 0 |
| bisphenol A | 1.3 | 0 | 2.9 | 0 |
| acetone | 0.19 | 0.29 | 0.15 | 0.11 |
| MeCl$_2$ | 0.18 | 0.18 | 0.13 | 0.19 |
| quat salt | 2.95 | 0.143 | 2.74 | 0.1305 |

EXAMPLE 2

The experiment of Example 1 was repeated, except that samples were taken off the column at ⅓ and ⅔ of its height for analysis. The results are summarized in Table 2, and show that elimination of phenol, disphenol A and quat salt occur quite quickly, while acetone and methylene chloride levels actually increase in concentration for some period of time. This may arise from in situ formation of acetone and methylene chloride during the breakdown of bisphenol A and quat salt, respectively, and suggests that the residence time should be increased if the presence of these materials at these concentrations proves detrimental to the operation of the electrolysis cell, and they are not adequately removed by the carbonation removal section.

TABLE 2

| Component | Influent (mg/l) | 1/3 (mg/l) | 2/3 (mg/l) | effluent (mg/l) |
|---|---|---|---|---|
| phenol | 0.16 | 0 | 0.01 | 0 |
| bisphenol A | 1.7 | 0 | 0 | 0 |
| acetone | 0.13 | 0.22 | 0.14 | 0.09 |
| MeCl$_2$ | 0.09 | 0.07 | 0.14 | 0.17 |
| quat salt | 2.36 | 0.102 | 0.086 | 0.08 |

EXAMPLE 3

Two 1000 liter samples of a waste NaCl brine stream from an interfacial polycarbonate plant was filtered with a Kallsep filter to produce a filtered brine having a solids content of 0.5–1 mg/ml, and passed through an ozonation unit operating as described in Example 1. The ozonated sample was decarbonated by additional of 33% HCl to a final pH of about 3–4, which results in a decarbonated brine with a carbonate concentration of 0.8–0.9 mg/l. This decarbonated brine was then evaporated to 24.5 wt %.

The resulting brine was analyzed as described in Example 1 for organic contaminants, and by titration with HCl on pH for carbonate levels. The results are summarized in Table 3.

TABLE 3

| Component | Conc in Batch 1 (mg/l) | Conc in Batch 2 (mg/l) |
|---|---|---|
| bisphenol A | <0.01 | <0.01 |
| methylene chloride | <0.01 | <0.01 |
| acetone | 0.06 | 0.05 |
| phenol | 0.02 | 0.02 |
| quat salt | 0.1 | 0.12 |
| carbonate | 0.8 | 0.9 |

This composition is suitable for use as a recycle feedstock to the electrolytic chlorine facility.

EXAMPLE 4

Three brine samples, an ozone treated brine in accordance with the invention, a very clean reference brine and an untreated brine were evaluated in a brine electrolysis test. Each of the brines was used as a feedstock for electrolysis in a membrane electrolysis cell for a period of 5 days at a constant current density of 3 kA/m2. At the end of this time, the membrane voltage as a function of the current density was measured. As shown in FIG. 4, the performance of the membrane used for electrolysis of the ozone treated brine was superior to that of the untreated brine, although not quite as good as the very clean reference brine.

What is claimed is:

1. A method for treating a waste NACl brine stream produced in an interfacial polycarbonate plant to produce a treated brine for use in electrolytic production of chlorine, comprising the steps of
   (a) combining the waste brine stream with ozone to produce an ozonated brine in which concentrations of organic contaminants are reduced;

(b) acidifying the ozonated brine to remove carbonates and produce a decarbonated brine; and (c) concentrating the decarbonated brine to produce a treated brine in which the concentration of NaCl is at least 10 wt % NaCl.

2. The method of claim 1, wherein the treated brine has a concentration of at least 20wt % NaCl.

3. The method of claim 1, wherein the concentrating step is performed by evaporation.

4. The method of claim 3, wherein additional NaCl is added to the decarbonated brine prior to concentration.

5. The method of claim 1, wherein the ozonated brine is acidified with HCl.

6. A method for production of polycarbonate comprising the steps of:

(a) electrolytically preparing chlorine from a NaCl brine in a chlorine facility;

(b) reacting chlorine prepared in the chlorine facility with carbon monoxide to produce phosgene in a phosgene facility;

(c) reacting the phosgene prepared in the phosgene facility with a dihydric phenol in the presence of a base or basic catalyst to produce polycarbonate and a waste brine stream;

(d) combining the waste brine stream with ozone to produce an ozonated brine in which concentrations of organic contaminants are reduced;

(e) acidifying the ozonated brine to remove carbonates and produce a decarbonated brine;

(f) concentrating the decarbonated brine to produce a treated brine in which the concentration of NaCl is at least 10 wt % NaCl; and (g) recycling the concentrated brine to the chlorine facility as a feedstock for the electrolytic preparation of chlorine.

7. The method of claim 6, wherein the treated brine has a concentration of at least 20 wt % NaCl.

8. The method of claim 6, wherein the concentrating step is performed by evaporation.

9. The method of claim 8, wherein additional NaCl is added to the decarbonated brine prior to concentration.

10. The method of claim 8, wherein the additional NaCl is anolyte brine produced by the chlorine facility.

11. The method of claim 6, wherein the ozonated brine is acidified with HCl.

12. A brine recovery facility for purification of NaCl brine for recycle to an electrolytic chlorine facility comprising:

(a) an ozonation unit for producing ozonated brine with reduced levels of organic impurities;

(b) a carbonate removal section in which the ozonated brine is acidified to release carbon dioxide and produce a decarbonated brine; and (c) a concentrator for concentrating the decarbonated brine to a NaCl level sufficient for use in an electrolytic chlorine facility.

13. The brine recovery facility of claim 12, wherein the concentrator is an evaporator.

14. The brine recovery facility of claim 12, further comprising a filter for removal of particulates having a size of greater than 2 microns from brine being purified.

15. The brine recovery facility of claim 14, wherein the filter is disposed to filter the brine prior to introduction to the ozonation unit.

16. A plant for manufacture of polycarbonate comprising:

(a) a electrolytic chlorine facility for production of chlorine and caustic from brine;

(b) a phosgene facility for production of phosgene from chlorine prepared in the chlorine facility and carbon monoxide;

(c) a polycarbonate facility for preparation of polycarbonate by reaction of a dihydric phenol with phosgene in the presence of a base, said polycarbonate facility producing a waste NaCl brine stream; and (d) a brine recovery facility for purification of the waste NaCl brine stream for recycle to the electrolytic chlorine facility, wherein the brine recovery facility comprises
an ozonation unit for producing ozonated brine with reduced levels of organic impurities;
a carbonate removal section in which the ozonated brine is acidified to release carbon dioxide and produce a decarbonated brine; and
a concentrator for concentrating the decarbonated brine to a NaCl level sufficient for use in the electrolytic chlorine facility.

17. The plant of claim 16, wherein the concentrator is an evaporator.

18. The plant of claim 16, wherein the brine recovery unit further comprises a filter for removal of particulates having a size of greater than 2 microns from brine being purified.

19. The plant of claim 18, wherein the filter is disposed to filter the brine prior to introduction to the ozonation unit.

20. The plant of claim 16, wherein anolyte brine produced by the chlorine facility is combined with the decarbonated brine prior to concentration.

21. A method for removing organic contaminants from brine solutions comprising the step of passing the brine solution and ozone through a column containing an activated catalyst effective to absorb and oxidize the organic contaminates in the presence of the ozone.

22. A purified NaCl brine composition for use as a feedstock in an electrolytic cell for the production of chlorine, prepared by (a) combining a waste NaCl brine stream produced in an interfacial polycarbonate plant with ozone to produce an ozonated brine in which concentrations of organic contaminants are reduced;

(b) acidifying the ozonated brine to remove carbonates and produce a decarbonated brine; and (c) concentrating the decarbonated brine to produce a treated brine in which the concentration of NaCl is at least 10 wt % NaCl.

* * * * *